(12) United States Patent
Chithambaram et al.

(10) Patent No.: US 7,236,173 B2
(45) Date of Patent: Jun. 26, 2007

(54) METHOD AND APPARATUS FOR PROVIDING ACCESS TO MAPS ON A THIN CLIENT

(75) Inventors: Nemmara Chithambaram, Novato, CA (US); Howard Marantz, Forestville, CA (US); John R. DeAguiar, Sebastopol, CA (US); Gregory Andrew Roy, Calgary (CA); Kevin Glen Robinson, Calgary (CA); Roderick Gaetan Munro, Calgary (CA)

(73) Assignee: Autodesk, Inc., San Rafael, CA (US)

( * ) Notice: Subject to any disclaimer, the term of this patent is extended or adjusted under 35 U.S.C. 154(b) by 526 days.

(21) Appl. No.: 10/770,869

(22) Filed: Feb. 3, 2004

(65) Prior Publication Data

US 2004/0157641 A1    Aug. 12, 2004

Related U.S. Application Data

(63) Continuation-in-part of application No. 10/642,857, filed on Aug. 18, 2003, which is a continuation of application No. 10/008,625, filed on Dec. 6, 2001, now Pat. No. 6,642,925, which is a continuation of application No. 09/411,506, filed on Oct. 4, 1999, now Pat. No. 6,337,693, which is a continuation of application No. 08/757,706, filed on Oct. 30, 1996, now Pat. No. 5,966,135, said application No. 10/770,869 is a continuation-in-part of application No. 09/629,115, filed on Jul. 31, 2000.

(60) Provisional application No. 60/193,862, filed on Mar. 30, 2000, provisional application No. 60/193,153, filed on Mar. 29, 2000, provisional application No. 60/193,142, filed on Mar. 29, 2000, provisional application No. 60/193,141, filed on Mar. 29, 2000, provisional application No. 60/159,069, filed on Oct. 12, 1999.

(51) Int. Cl.
*G06T 15/00* (2006.01)
(52) U.S. Cl. ............... 345/440; 701/207; 701/211; 705/6; 705/28
(58) Field of Classification Search ............... 345/440; 701/200, 207, 211; 705/6, 26, 28
See application file for complete search history.

(56) References Cited

U.S. PATENT DOCUMENTS 5,231,584 A    7/1993    Nimura et al.

(Continued)

FOREIGN PATENT DOCUMENTS

WO    WO 97/07467    2/1997

OTHER PUBLICATIONS

ARGU95, Argus User's Guide 3.0, The Next Generation in GIS, Munro Garrett International, May 1994, p. 176-180.

(Continued)

*Primary Examiner*—Phu K. Nguyen
(74) *Attorney, Agent, or Firm*—Gates & Cooper LLP (57) ABSTRACT

A method, system, and article of manufacture provide for an interactive geographic information system on a thin client. Geographic information may be viewed and interacted with on the thin client. The information is available while the thin client is connected or disconnected to/from a network. The thin client has functionality commonly available in a standard client including raster maps for multiple zoom levels of multiple tiles, raster zooms, selectable vector geometry, geo-referencing information for map navigation, metadata in the form of layer definitions, links to object attributes in databases, links to object reports generated by corporate web servers, uploadable, sharable redlining data, offline access, and a compact database.

54 Claims, 9 Drawing Sheets

U.S. PATENT DOCUMENTS

| | | | |
|---|---|---|---|
| 5,528,248 A | 6/1996 | Steiner et al. | |
| 5,543,789 A | 8/1996 | Behr et al. | |
| 5,559,707 A | 9/1996 | DeLorme et al. | |
| 5,673,421 A | 9/1997 | Shirakawa | |
| 5,689,431 A | 11/1997 | Rudow et al. | |
| 5,699,244 A | 12/1997 | Clark, Jr. et al. | |
| 5,727,159 A | 3/1998 | Kikinis | 395/200.76 |
| 5,848,373 A | 12/1998 | DeLorme et al. | |
| 5,938,721 A | 8/1999 | Dussell et al. | |
| 5,966,135 A | 10/1999 | Roy et al. | |
| 5,973,678 A | 10/1999 | Stewart et al. | |
| 5,974,431 A | 10/1999 | Iida | |
| 5,995,101 A | 11/1999 | Clark et al. | |
| 6,040,824 A | 3/2000 | Maekawa et al. | |
| 6,057,854 A | 5/2000 | Davis, Jr. et al. | |
| 6,124,858 A | 9/2000 | Ge et al. | |
| 6,166,734 A | 12/2000 | Nahi | |
| 6,182,010 B1 | 1/2001 | Berstis | |
| 6,192,518 B1 | 2/2001 | Neal | |
| 6,321,158 B1 | 11/2001 | DeLorme et al. | |
| 6,337,693 B1 | 1/2002 | Roy et al. | |
| 6,343,290 B1 | 1/2002 | Cossins et al. | |
| 6,370,449 B1 | 4/2002 | Razavi et al. | |
| 6,456,938 B1 | 9/2002 | Barnard | |
| 6,477,575 B1 | 11/2002 | Koeppel et al. | |
| 6,505,242 B2 | 1/2003 | Holland et al. | |
| 6,542,813 B1 | 4/2003 | Kovacs | |
| 6,560,620 B1 | 5/2003 | Ching | |
| 6,604,046 B1 | 8/2003 | Van Watermulen et al. | |
| 6,654,683 B2 | 11/2003 | Jin et al. | |
| 6,826,473 B1 * | 11/2004 | Burch et al. | 701/207 |
| 6,934,628 B2 * | 8/2005 | Harada | 701/211 |
| 7,043,362 B2 * | 5/2006 | Krull et al. | 701/211 |
| 7,099,771 B1 * | 8/2006 | Walters et al. | 701/200 |
| 2002/0128903 A1 | 9/2002 | Kernahan | |

OTHER PUBLICATIONS

XERO95, Map Viewer Technical Details, Xerox Corporation, Jun. 2, 1995, 3 pp.

XERO95, Mapwriter (1) User Commands, Xerox Corporation, Nov. 5, 1993, 4pp.

XERO95, About the Xerox PARC Map Viewer, Xerox Corporation, Jun. 1993, 1p.

Potmesil, M. "Maps Alive: Viewing Geospatial Information on the WWW," Computer Networks and ISDN Systems, 1997, 29: 1327-1342.

* cited by examiner

METHOD AND APPARATUS FOR PROVIDING ACCESS TO MAPS ON A THIN CLIENT

CROSS-REFERENCE TO RELATED APPLICATIONS

This application claims the benefit under 35 U.S.C. Section 120 of the following co-pending and commonly-assigned U.S. utility patent application(s), which is/are incorporated by reference herein:

U.S. patent application Ser. No. 10/642,857, filed Aug. 18, 2003, by Gregory Andrews Roy, Osman Hamid Bux, Kevin Glen Robinson, and Roderick Gaetan Munro, entitled "VECTOR BASED GEOGRAPHIC DATA", which application is a continuation of commonly-assigned patent application Ser. No. 10/008,625, filed Dec. 6, 2001, by Gregory Andrew Roy, Osman Hamid Bux, Kevin Glen Robinson, and Roderick Gaetan Munro, entitled "VECTOR BASED GEOGRAPHIC DATA", now U.S. Pat. No. 6,642,925, issued on Nov. 4, 2003; which application is a continuation of commonly-assigned patent application Ser. No. 09/411,506, filed Oct. 4, 1999, by Gregory Andrew Roy, Osman Hamid Bux, Kevin Glen Robinson, and Roderick Gaetan Munro, entitled "VECTOR BASED GEOGRAPHIC DATA", now U.S. Pat. No. 6,337,693, issued on Jan. 8, 2002, which application is a continuation of commonly-assigned patent application Ser. No. 08/757,706, filed on Oct. 30, 1996, by Gregory Andrew Roy, Osman Hamid Bux, Kevin Glen Robinson, and Roderick Gaetan Munro, entitled "VECTOR BASED GEOGRAPHIC DATA", now U.S. Pat. No. 5,966,135, issued on Oct. 12, 1999; and U.S. patent application Ser. No. 09/629,115, entitled "METHOD AND APPARATUS FOR PROVIDING ACCESS TO MAPS ON A PERSONAL DIGITAL ASSISTANT (PDA)", by Nemmara Chithambaram, Howard Marantz, and John R. DeAguiar, filed on Jul. 31, 2000, which application claims the benefit under 35 U.S.C. §119(e) of the following co-pending and commonly assigned U.S. Provisional patent applications, which applications are also incorporated by reference herein:

U.S. application Ser. No. 60/159,069, entitled "MAPGUIDE PERSONAL DIGITAL ASSISTANT," filed on Oct. 12, 1999, by Nemmara Chithambaram, et. al.,;

U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al.,;

U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al.,;

U.S. application Ser. No. 60/193,142, entitled "INTER-PROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al.,; and U.S. application Ser. No. 60/193,862, entitled "MAPGUIDE FOR MOBILE DEVICES SERVER," filed on Mar. 30, 2000, by Nemmara Chithambaram, et. al.

This application is related to the following co-pending and commonly-assigned patent application, which application is incorporated by reference herein:

U.S. patent application Ser. No. 09/629,117, entitled "METHOD AND APPARATUS FOR OBTAINING A SET OF MAPS", by Nemmara Chithambaram et al., filed on Jul. 31, 2000;

U.S. patent application Ser. No. 09/628,850, entitled "GENERALIZED, DIFFERENTIALLY ENCODED, INDEXED RASTER VECTOR DATA AND SCHEMA FOR MAPS ON A PERSONAL DIGITAL ASSISTANT", by Nemmara Chithambaram et al., filed on Jul. 31, 2000, now U.S. Pat. No. 6,674,445, issued on Jan. 6, 2004; and U.S. patent application Ser. No. 09/628,851, entitled "GEOGRAPHICAL DATA MARKUP ON A PERSONAL DIGITAL ASSISTANT (PDA)", by Nemmara Chithambaram et al., filed on the Jul. 31, 2000.

BACKGROUND OF THE INVENTION

1. Field of the Invention

The present invention relates generally to electronic maps and geographic information, and in particular, to a method, apparatus, and article of manufacture for providing access to maps and geographic data on a personal digital assistant (PDA).

2. Description of the Related Art

Computer implemented geographic information systems (GIS) are known in the art. Such GIS provide for the retrieval and display of geographic information (e.g., maps). A GIS is a system of software, hardware, and data that delivers geographic data (street maps, property boundaries, power transmission lines, etc.) along with any associated attribute information. It can show you where a street is and also tell you the street name, when it was last paved, whether it is a one-way street, etc. Using a GIS, a user can perform complex queries (from a web browser to a server) to discover such things as how many people live near the street, what their income level is, and what the zoning laws are. A GIS can operate on a network/internet wherein the geographic information is stored on a server and transmitted to a client/user where the information (map picture and other data) is displayed on a web browser.

For the client to properly display the geographic information, a computer system with the appropriate processing capabilities, software, and memory is required. For example, a client may be required to utilize a computer with a web browser such as INTERNET EXPLORER or NETSCAPE NAVIGATOR and have a minimum of 10 megabytes of available memory. Additionally, to display the geographic data such that a user does not have to wait an inordinate amount of time to retrieve and load the data, an appropriate internet connection (e.g., a 28.8 Kbps (kilo bits per second) modem) and a computer system with significant processing power (e.g., a minimum speed of 100 megahertz) may be required.

Field/utility technicians such as gas company employees, salespersons, plumbers, insurance adjusters, or any type of employment that requires travel to different locations, often utilize or require access to maps and geographic information. Further, such technicians often need to interact with a map to obtain relevant information. For example, a plumber/contractor may want to determine where the main gas line or water line on a street is located. However, while out in the field, the technicians often do not have a network connection, and carrying a laptop or desktop computer is cumbersome and impractical. Thus, it is desirable to have a small (handheld) portable computing device with the capabilities to display and interact with geographic information both online and offline.

Prior art handheld computing devices (also referred to as palm PCs or personal digital assistants (PDAs)), are often used to access and utilize personal information. Many handheld computing devices are available in today's marketplace. Typically, handheld computing devices are only slightly larger than the size of one's palm (hence, the name palm PC) and have a small display screen for viewing a plethora of items. Software can be installed on a PDA to provide enhanced functionality. For example, a personal productivity tool may be installed to provide access to a calendar, contacts, email, Internet browsing, audio books, and audio recording capabilities. Card slots may also be available to provide additional memory or other functions (e.g., a modem). Additionally, some PDAs have infrared (IR) ports for communication.

The PDA environment, however, poses several challenges for geographic information systems in terms of memory, storage, processor speeds, wireless transmission rates, and display attributes. For example, PDAs commonly only maintain 96 K or less of memory, 2 Mb (megabytes) or less storage, a 13 MHz processor speed, and a black and white or gray scale display mechanism. Further, field technicians using a PDA need to view and interact with maps displayed. The low bandwidth offered by wireless transmission services, coupled with the slow processors result in unacceptable download times. Also, the technicians in many instances work in trenches or other places where it is not possible to establish a connection to the servers (requiring offline usage).

Thus, there is a need for a geographic information system that overcomes the above described deficiencies on a portable handheld electronic device such as a PDA.

To help better understand embodiments of the invention, it is useful to describe the data utilized in prior art geographic information systems. Prior art geographic information systems display map pictures that are generated using raster data. Raster data represents a map picture with points in a grid. For example, on an X-Y axis, there may be a thousand points in the X direction and seven hundred and sixty points in the Y direction. Each of these points represents a color. For example, some computer systems enable each point to represent one of eight colors. A map picture is then created by determining a color for each point in the grid.

Each map picture is static in that portions of the map picture cannot change independently of each other. That is, a portion of a map picture cannot be modified while viewing the map picture. Thus, while a map image may contain several layers of information, the information is merely a picture with no live data. When a portion of the map picture is to be modified, queried, or to perform any GIS analysis, the browser must request more data from the main server and the entire map picture is replaced. For example, each map picture, such as one representing the United States (US), may contain several layers of information, such as states, counties, and streets. When a user is viewing a map picture of the United States and wishes to view the counties in a particular state, the map picture is replaced with another map picture that contains the additional information. Typically, the additional information is stored at a server computer and the map picture is displayed at a client computer. When the map picture that is displayed is to be modified, the additional information is downloaded from the server computer. Because this additional information is in the form of raster data, it is typically time-consuming to download.

Additionally, some computer systems display schematics generated from vector-based data in computer aided design (CAD) files. Vector-based data uses descriptions of elements of the schematic to create the schematic. For example, if the schematic contains a line segment, the CAD file describes the line segment with an endpoint and a length. Moreover, these computer systems enable users to view data in CAD files from the Internet and Intranets. For instance, when a user at a computer system wishes to view a schematic, the computer system downloads all of the data in the CAD file for that schematic from a data storage device via the Internet. The CAD file typically contains data corresponding to different levels of design of the schematic. In some instances, a user may wish to view only some of the data in the files, for example, the highest level of design of the schematic. In this case, although only a portion of data is required to display the schematic requested by the user, the computer system has already downloaded all of the data in the CAD file. Because it is time-consuming to download all of the data, it is inefficient to do so when only a portion of the data is required to satisfy a user's request. Further, it may not be possible to download all or even a portion of the data onto a PDA.

SUMMARY OF THE INVENTION

One or more embodiments of the invention provide for an interactive geographic information system on a personal digital assistant (PDA). The system enables the viewing and interaction with geographic information on a PDA. Such information is available while the PDA is connected to a network (i.e., online) and while disconnected (i.e., offline).

The PDA maintains the functionality commonly available in a standard client comprised of a complete computer system. For example, the PDA provides raster maps for multiple zoom levels, with each zoom level comprising multiple tiles allowing for "virtual roaming" across a map. The PDA also provides selectable vector geometry (for interacting and highlighting with user objects), geo-referencing information for map navigation, meta-data in the form of layer definitions (visibility, display attributes, etc.), links to object attributes in databases, links to object reports generated by corporate web servers, uploadable, sharable redlining data (created from scribbles on the field), offline access on a PDA, and a compact PDA database.

Thus, interactive maps and business objects that can be viewed and queried on a PDA, both in an online and offline mode are provided.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for the use of the MAPGUIDE geographical information system (available from the assignee of the present invention) on a personal digital assistant (PDA). Software on the PDA is enabled to provide such functionality. Further, a servlet that provides enhanced server functionality interfaces between the web server and the PDA to accommodate any additional processing needed.

Raster maps provide multiple zoom levels with each zoom level comprising multiple tiles that allow for "virtual roaming" across a map. Further, selectable vector geometry (for interacting and highlighting with user objects), geo-referencing information for map navigation, meta-data in the form of layer definitions (visibility, display attributes, etc.), links to object attributes in databases, links to object reports generated by corporate web servers, uploadable, sharable redlining data (created from scribbles on the field), and access to geographical information both online and offline on the PDA are provided. Accordingly, users will maintain the ability to access maps and other geographical information while offline and not connected to a network or server.

General Architecture

Hardware Environment

The use, on a PDA, of a modified MAPGUIDE GIS currently available from the assignee of the present invention is provided. The existing MAPGUIDE GIS is more fully described in co-pending U.S. patent application Ser. No. 09/411,506, entitled "VECTOR-BASED GEOGRAPHIC DATA", by Gregory Andrew Roy, et. al., filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA".

Figure 1:
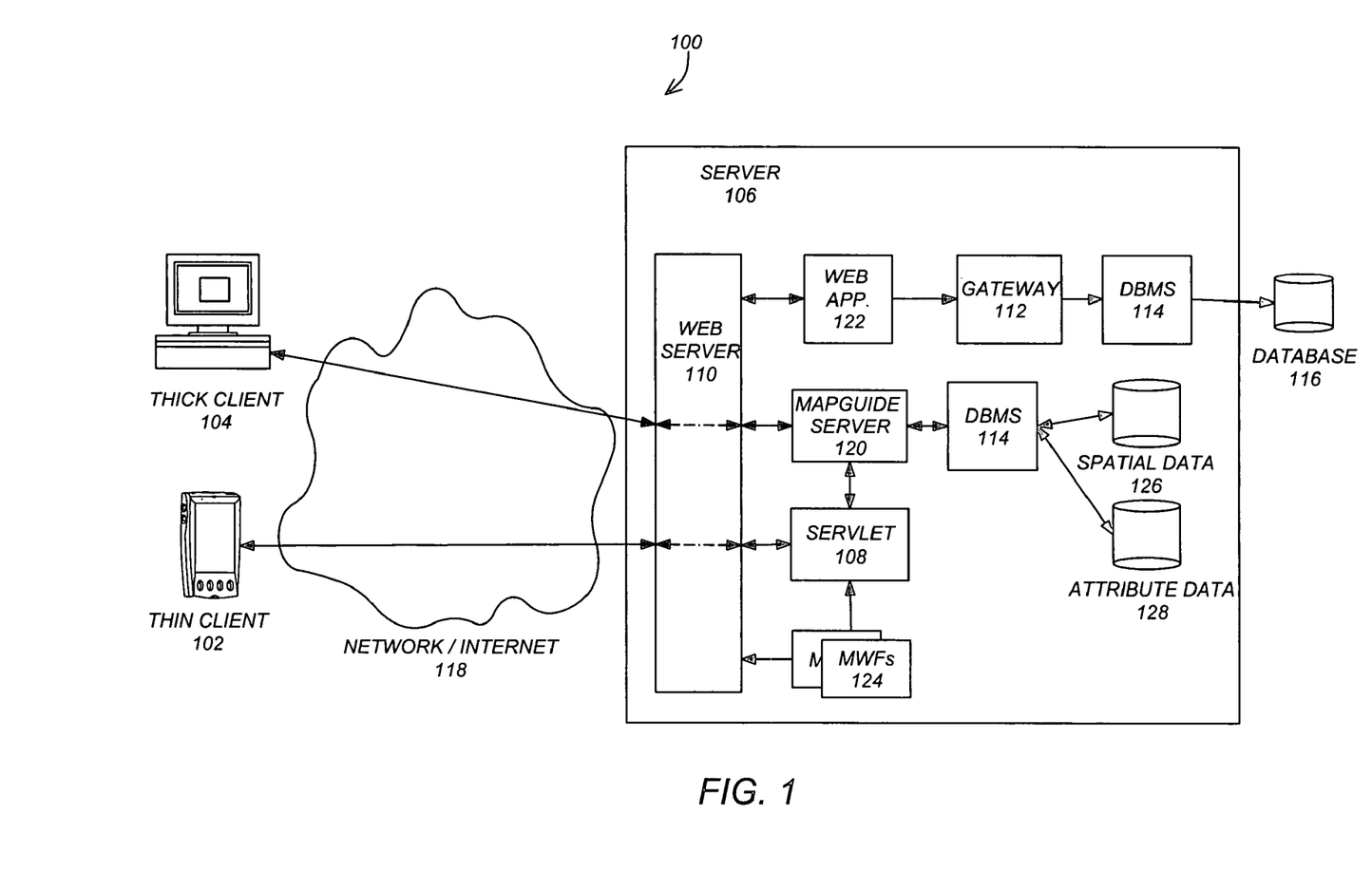
FIG. 1 schematically illustrates a hardware and software environment for the architecture in accordance with one or more embodiments of the invention.

FIG. 1 schematically illustrates a hardware and software environment for the architecture in accordance with one or more embodiments of the invention. A typical distributed computer system 100 uses a network/Internet 118 to connect technicians utilizing clients such as a thin client 102 (e.g. a PDA, WINCE, or PALM device) or a thick client 104 (e.g., a computer system running a browser) to server computers 106.

A thick client 104 as utilized in the existing MAPGUIDE GIS may comprise a computer with a web browser (enhanced with a plugin or viewer) connected to a web server 110 that communicates with a MapGuide server 120 to retrieve data (e.g., raster data, spatial data format (SDF) data 126, attribute data 128, etc.).

A thin client includes three classes of devices: handheld personal computers (HPC), palm-held personal computers (PPC or PDA), and smart phones. Using these devices, a thin client 102 may not provide the full processing and memory capabilities as a thick client 104. For example, as described above with respect to PDAs, thin clients 102 often have memory less than 100 K, storage of less than 2–4 MB, processor speeds of 13 MHz, and limited display attributes. Consequently, additional server 106 side support (e.g., more generalized display data, simplified project files, de-cluttering services, and possibly server management of user state) may be utilized. A typical combination of resources may include a network/Internet 118 comprising the Internet, LANs, WANs, SNA networks, or the like, clients 102 and 104 that are PDAs, personal computers or workstations, and servers 106 that are personal computers, workstations, minicomputers, or mainframes.

The network/Internet 118 connects client computers 102 and 104 executing the appropriate software applications to server computers 106 executing Web servers 110, MapGuide servers 120, and servlets 108. MagGuide servers 120 and servlets 108 may be located within or part of web server 110. The server 106 and its components may also be referred to as a back office system. Such a back office system maintains access to corporate databases, synchronization utilities, etc. The Web server 110 is typically a program such as IBM's HyperText Transport Protocol (HTTP) Server or Microsoft's Internet Information Server. The servlet 108 communicates with thin client 102 through web server 110 such that any additional processing required by a thin client 102 may be performed by the servlet 108. Servlet 108 communicates with MapGuide server 120 to obtain needed map data/information. Additionally, servlet 108 accesses map windows files (MWF) 124 to obtain relevant data. The servers 106 may also execute a Common Gateway Interface (CGI) 112 (or Netscape Application Programming Interface (NSAPI), Internet Server Application Programming Interface (ISAPI), etc.), which interfaces between the Web server 110 and a database management system DBMS) 114 that may be utilized to retrieve relevant geographical data (such as SDF data, taster data, Open DataBase Connectivity (ODBC) data, etc.) from database 116.

Generally, components 108–116 and 120–128 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Software Embodiments

In accordance with the hardware descriptions, thick clients 104 are complete computer systems with web browsers and full processing capabilities. However, the hardware limitations of a PDA device necessitate software limitations. Accordingly, to enable a geographic information system on a PDA, a thin client 102 is provided. To accommodate the thin client, additional support on server 106 may be utilized. For example, server 106 may provide more generalized display data, simplified project files, de-cluttering services, and possibly server management of the user state.

The architecture of the invention includes a data model that combines static raster layers (static raster data for multiple layers) with live vector objects to deliver good display and download performance, and also provides interactive selectable objects.

Vector based maps (also referred to as "map layer data" consisting of geographic information/data for one or more layers) are served by a servlet 108 and are an encoded and spatially indexed vector representation of the geographic data. Such vector maps provide for a more "interactive" display with flexible zooming on the client 102, highlighting, etc. Alternatively, the Scalable Vector Graphics (SVG) representation as proposed by the WorldWideWeb Consortium (W3C) may be utilized. SVG allows for three types of graphic objects: vector graphic shapes (e.g., paths consisting of straight lines and curves), images, and text. Graphical objects can be grouped, styled, transformed, and composited into previously rendered objects.

A display background (that is raster based) for the geographic data and display layers is managed as a multi-level library of raster tiles. The raster layers are composed from multiple vector layers on servlet 108, resulting in better download and display performance. The raster map on the PDA allows panning (virtual roaming paradigm), and zooming across multiple levels. A smart-cache on thin client 102 allows the swapping of compact tiles from the database to memory, in a manner appropriate to the device. A single workspace per map provides the definition of the map and the display attributes for the layers on the thin client 102.

PDA users (e.g., technicians) can make scribbles and annotations on the map using a paper and pencil metaphor. To accommodate such redlining, embodiments provide a Redlining Object that consists of geometric scribbles (points, lines, polygons, symbols), GPS (global positioning system) input coordinates, annotations (positioned text with font information, etc.), and a geo-reference system that allows the redline object to be integrated into a spatial database 116 using server 106 and displayed on other maps. The redlining system captures user input and allows for redlining objects to be uploaded to server 106. Further, the level of sharing on the server 106 side is configurable (e.g., personal, group, global, etc.).

Details of Architecture

Thin Client 102

The user of a thin client 102 such as a PDA displays geographical information (e.g., maps). The architecture of the invention accommodates various thin clients 102 such as WINDOWS CE 2.x devices and smart phones with bit-mapped graphics (e.g., SYMBIAN, MOTOROLA, NOKIA, PSION). The startup time for the GIS on the PDA is comparable to other applications on the PDA. Further, the thin client 102 is enabled to store non-spatial data gathered from within the GIS application in a format suitable for uploading to or synchronizing with major relational database management system (RDBMS) vendors.

Thin client 102 supports a variety of net access patterns. For example, thin client 102 can have a connection to the back office system (e.g., server 106) periodically (e.g., at the beginning and/or the end of the day), on-demand (e.g., through a wireless modem), or continuously.

Figure 2A:
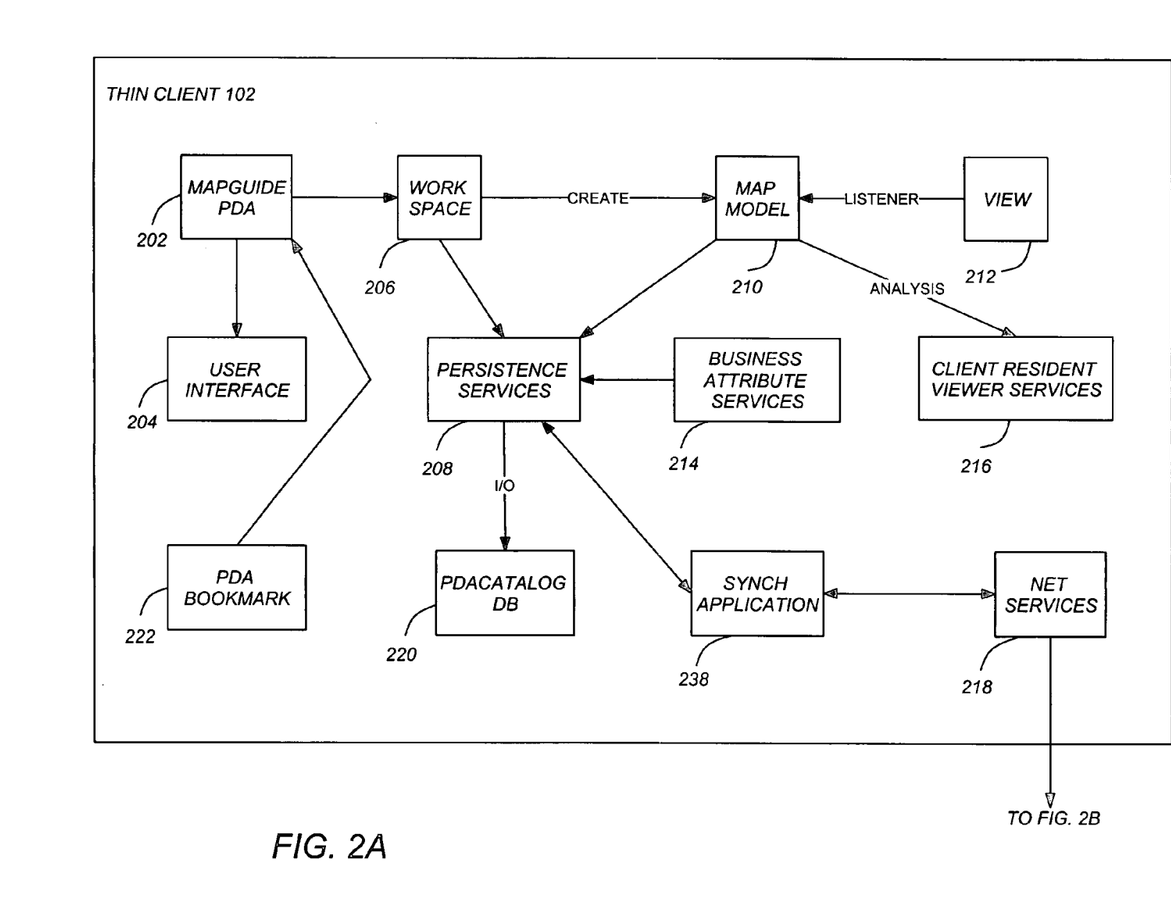
FIGS. 2A and 2B illustrate the interaction between a thin client, a servlet, and additional components in accordance with one or more embodiments of the invention.
Figure 2B:
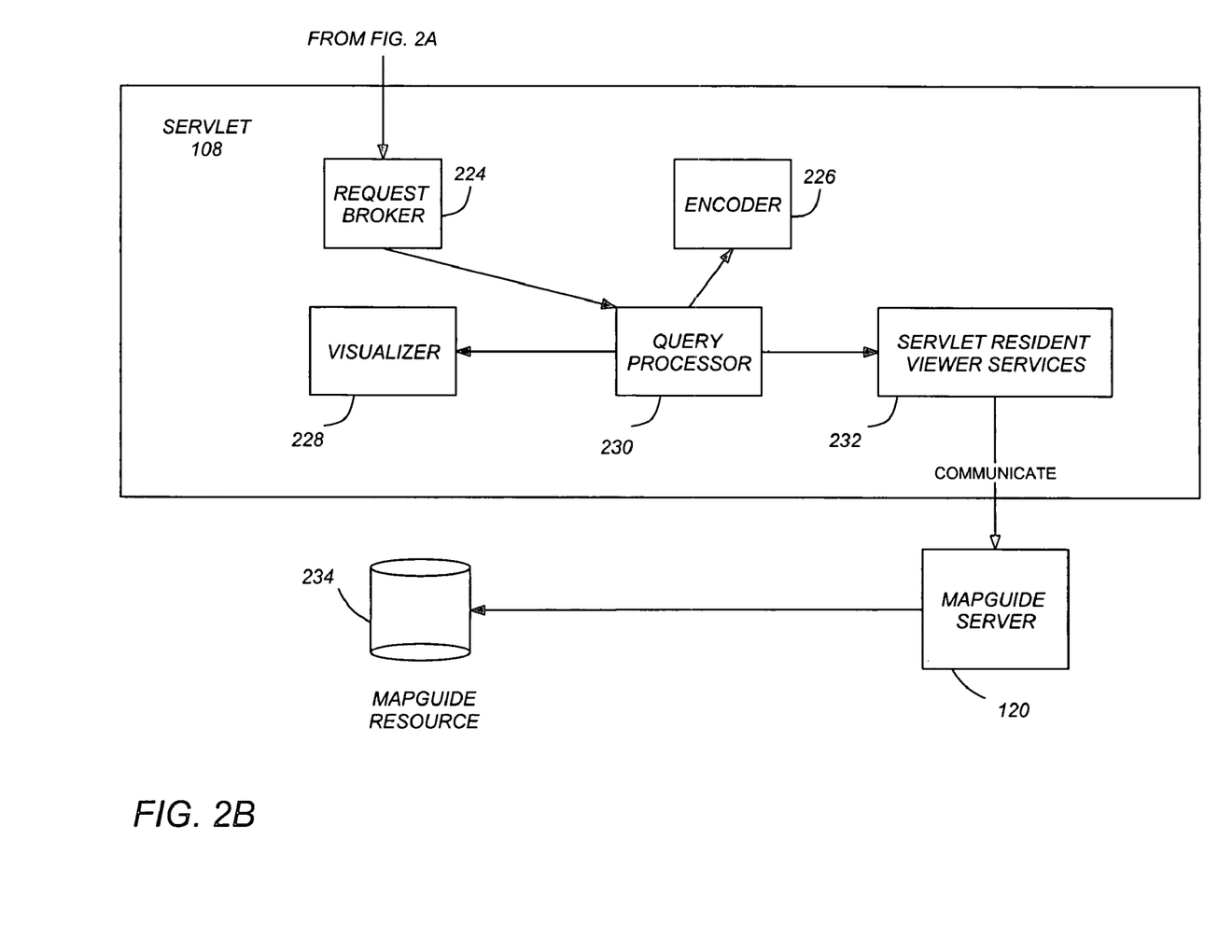

FIGS. 2A and 2B illustrate the interaction between thin client 102, servlet 108, and additional components. Thin client 102 is made up of subcomponents that allow viewing, navigation, and querying of a map model on the PDA. Thin client 102 also includes services that allow management of business attributes 128, communication with servlet 108, and persistence management.

To initialize the PDA thin client 102 with the appropriate map data, a user starts up the synchronization application 238. Synchronization application 238 is the application on the PDA thin client 102 responsible for synchronizing information and map data stored in a database 220 on PDA thin client 102 with the relevant map data. Synchronization application 238 utilizes net services 218 to communicate with servlet 108 (through web server 110) and to obtain the relevant map data. Net services component 218 provides services for two way communication (and exchange of data) with servlet 108 (i.e., following the link to FIG. 2B). Accordingly, synchronization application 238 may communicate with servlet 108 to obtain the location of the map data. Thereafter, synchronization application 238 retrieves/obtains the map data from the identified location.

Upon receipt of the map data in the synchronization application 238, persistent services 208 is utilized to store the data (by performing various I/O operations) in PDA catalog database 220. Thereafter, the synchronization process is complete. Such synchronization can be performed as often as desired depending on the configuration of the PDA thin client 102. For example, if thin client 102 has a wireless modem, the synchronization operation can be performed whenever desired. If however, a direct connection is required, synchronization can only occur when the thin client 102 is connected to network 118 (or to server 106).

The MapGuide PDA component 202 is the main application that provides the user interface (UI) 204 and responds to events. The user interface component 204 is the placeholder for the user interface controls that are specialized for the PDA. Accordingly, once the relevant map data has been retrieved using synchronization application 238, the MapGuide PDA application 202 may be initialized/started by the user.

MapGuide PDA component 202 requests the persistence services component 208 to load the active workspace 206. The active workspace 206 provides/creates the definition of the map model 210. Thus, the active workspace 206 may be seen as a minimized version of the traditional map file (referred to as a map window file (MWF)) for the PDA 102. The map model 210 provides the services related to maintaining and manipulating map layers and map objects.

The persistent services component 208 loads the workspace 206 by providing object based database management services (ODBMS) using the local PDA database (PDA CatalogDB 220). The PDA catalogDB 220 is the local database of geographic information that is resident on the PDA. Thus, the PDA catalogDB encapsulates the local PDA catalog database and provides the application programming interface (API) for record manipulation.

View component 212 listens to changes in the map model 210 and updates the map display when necessary. The business attributes services/manager component 214 provides services related to managing non-spatial business attributes.

Client resident viewer services 216 interact with map model component 210. The client resident viewer services component 216 provides a flexible architecture that allows viewer service components to reside on either the client 102 or the servlet 108. These services may be represented by two components: the client resident viewer services component 216 of FIG. 2A and the servlet resident viewer services component 232 of FIG. 2B. The services performed by client resident viewer services 216 and servlet resident viewer services 232 may be combined and reside entirely on client 102 or server 106. All client 102 components send requests for viewer services to the client resident viewer services 216. The client resident viewer services component 216 will perform the service if the required components are locally available on the client 102. If not, the request may be delegated to the servlet resident viewer services 232 through synchronization application 238. For example, for a given client configuration, polyline drawing services may be available on client 102, whereas buffering services may be available on servlet 108.

Figure 3:
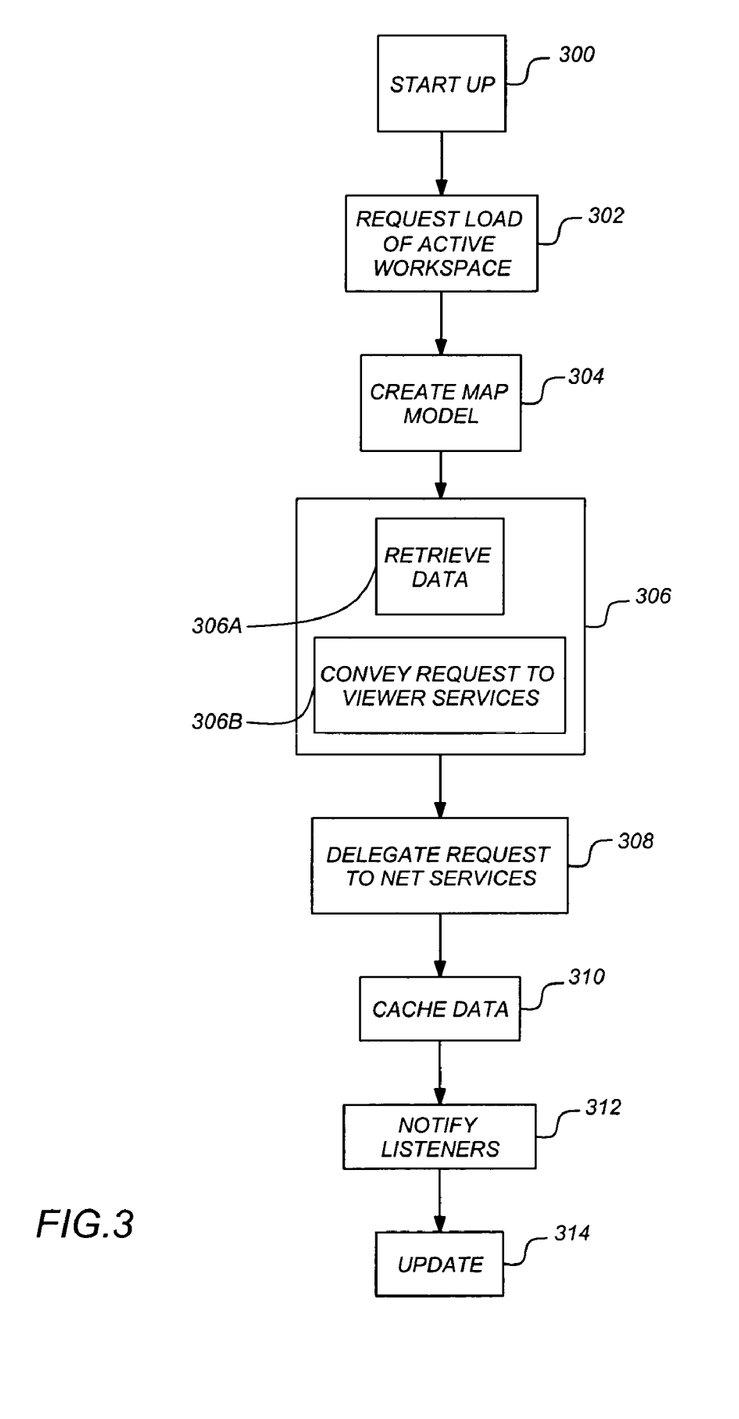
FIG. 3 is a flow chart illustrating the display of a map upon starting up a mapguide application on the PDA in accordance with one or more embodiments of the invention.

FIG. 3 is a flow chart illustrating the display of a map upon starting up a mapguide application 202 on the PDA in accordance with one or more embodiments of the invention. At step 300, the mapguide PDA 202 is asked to start up. At step 302, the mapguide PDA 202 requests the persistent services 208 to load the active workspace 206 (from the local PDA database 220). At step 304, the workspace 206 uses map definitions to create a new map model 210. The map model 210 populates layers in the model at step 306. The populating of step 306 may be performed by using the persistent services 208 to get data from the local PDA database 220 at step 306A and/or conveying the request to client resident viewer services 216 at step 306B. If client resident viewer services 216 determines that the service requires servlet resident viewer services 232, the client resident viewer services 216 delegates the request to net services 218 through synchronization application 238 at step 308.

At step 310, any downloaded data may be optionally cached in the local database 220 using persistent services 208. The model 210 notifies listeners (including the view 212) of the change at step 312. View 212 updates itself by getting display attributes from the workspace 206 and updating the map display at step 314.

Servlet 108

A servlet 106 accommodates any additional processing needed by PDA thin client 102. To take advantage of existing web servers 110 and servlet technology, servlet 108 may be implemented using the Java programming language. Alternatively, any programming language that performs/ provides Java servlet like functionality may be utilized. Accordingly, a single code stream is utilized to implement the servlet 108 on multiple platforms. A minimum set of constraints beyond those provided by web server 110 and the servlet 108 framework provide scalability. For example, each client 102 request may be self-contained in that it is responded to by a different instantiation of the servlet 108.

Servlet 108 may reside in a web server 110 and responds to requests for spatial and attribute data related to map objects, from multiple thin clients 102. Servlet 108 processes the requests, performs the visualization and encoding and places the results in a location that is accessible to the thin clients 102. FIG. 2B illustrates the subcomponents of servlet 108. The request broker 224 listens to and coordinates requests from multiple clients 102 (i.e., from FIG. 2A), and conveys the requests to the query processor 230. The query processor 230 processes the query using services provided by the servlet resident viewer services component 232. Query processor 230 also uses the visualizer component 228 and encoder component 226 to perform cartographic decluttering and encoding of the data to be sent back to or retrieve by the client 102. Visualizer component 228 performs configurable decluttering of data in a manner that is appropriate to the display of thin client 102. Encoder component 226 compacts and encodes the objects being retrieved by thin client 102. Servlet resident viewer services components 232 represents the servlet resident part of viewer services (as described above with respect to FIG. 2A) and communicates with mapguide server 120. The map guide server 120 may be web server 110 or a component of server 106.

Figure 4:
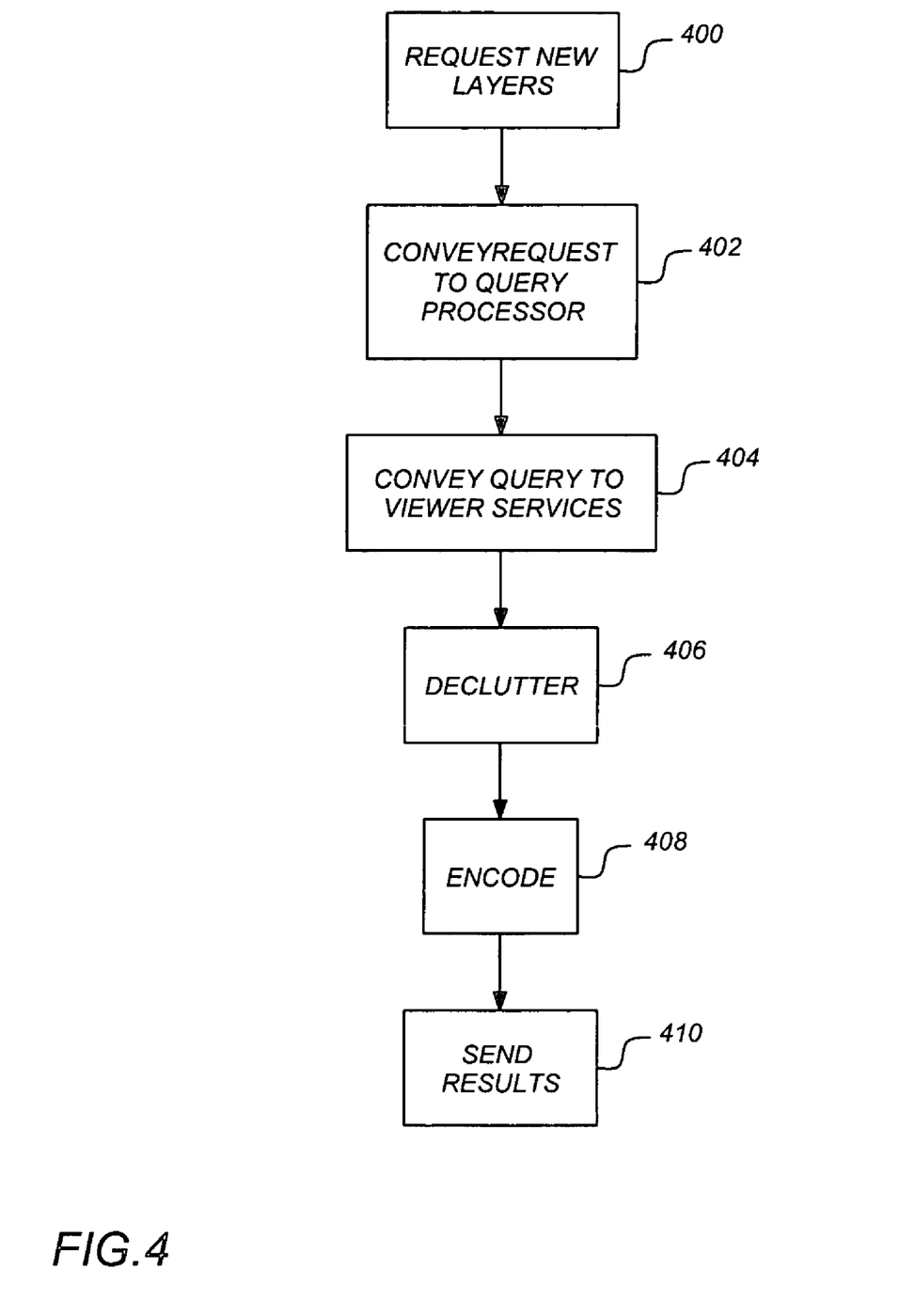
FIG. 4 is a flow chart illustrating how a servlet responds to requests from client net services in accordance with one or more embodiments of the invention.

FIG. 4 is a flow chart illustrating how servlet 108 responds to requests from received through net services 218. At step 400, net services 218 requests request broker 224 on servlet 108 to download new layers (for dynamic data). At step 402, the request broker 224 (after coordinating requests from other clients 102 if necessary) conveys the request to the query processor 230. The query processor 230 conveys the query to the servlet resident viewer services 232 and obtains the results at step 404. The results are decluttered (if specified) using the visualizer 228 at step 406 and encoded for compaction using the encoder 226 at step 408. The results (after visualization and encoding) or the location(s) where the results may be obtained are sent back to the client net services 218 at step 410.

Figure 5:
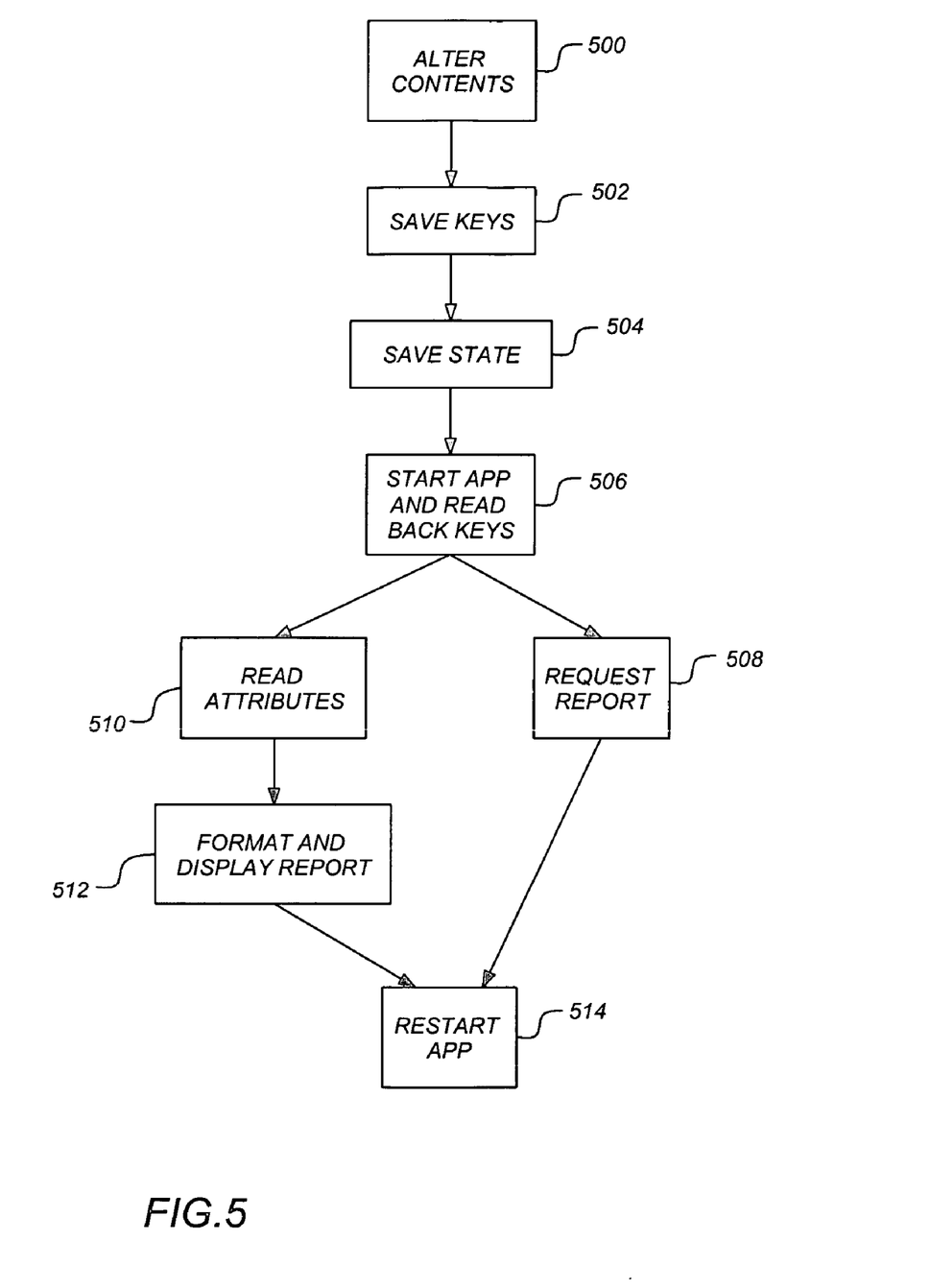
FIG. 5 is a flow chart illustrating how the client and servlet respond to requests to show reports (e.g., maps) in accordance with one or more embodiments of the invention.

FIG. 5 is a flow chart further illustrating how the client 102 and servlet 108 respond to requests to show reports (e.g., maps). At step 500, the user is given an opportunity to alter the contents of the selected map objects. At step 502, the keys of the selected objects are saved to the PDA database 220. The state of the mapguide PDA 202 is saved to the PDA database 220 at step 504. A report application (such as MapGuide PDA application 202) is started up and the keys of the selected objects are read back from the PDA database 220 at step 506.

For local reports, the business attributes for the selected objects are read from the PDA database 220 at step 510 and the report is formatted and displayed at step 512. For reports that require more extensive formatting services (e.g., COLD FUSION Application Server) or require data not stored in the local PDA database 220, a request is issued to net services 218 (through synchronization application 238) to obtain the report at step 508.

After the user is finished viewing the report, and possibly other reports linked to it, the mapguide PDA application 202 is re-started at step 514 at which time the application 202 restores itself to its last saved state.

Example Implementations

Figure 6:
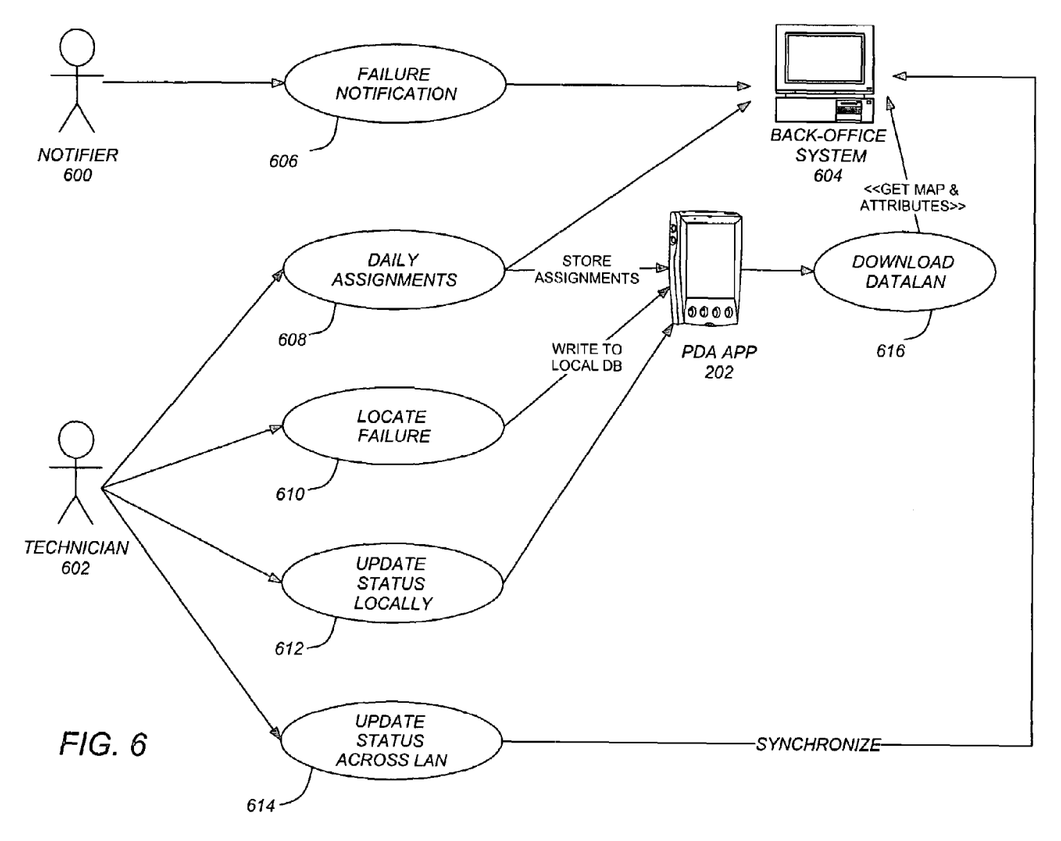
FIG. 6 illustrates the implementation wherein a field technician is working offline such that the technician only has net access at the beginning and end of the day in accordance with one or more embodiments of the invention.
Figure 7:
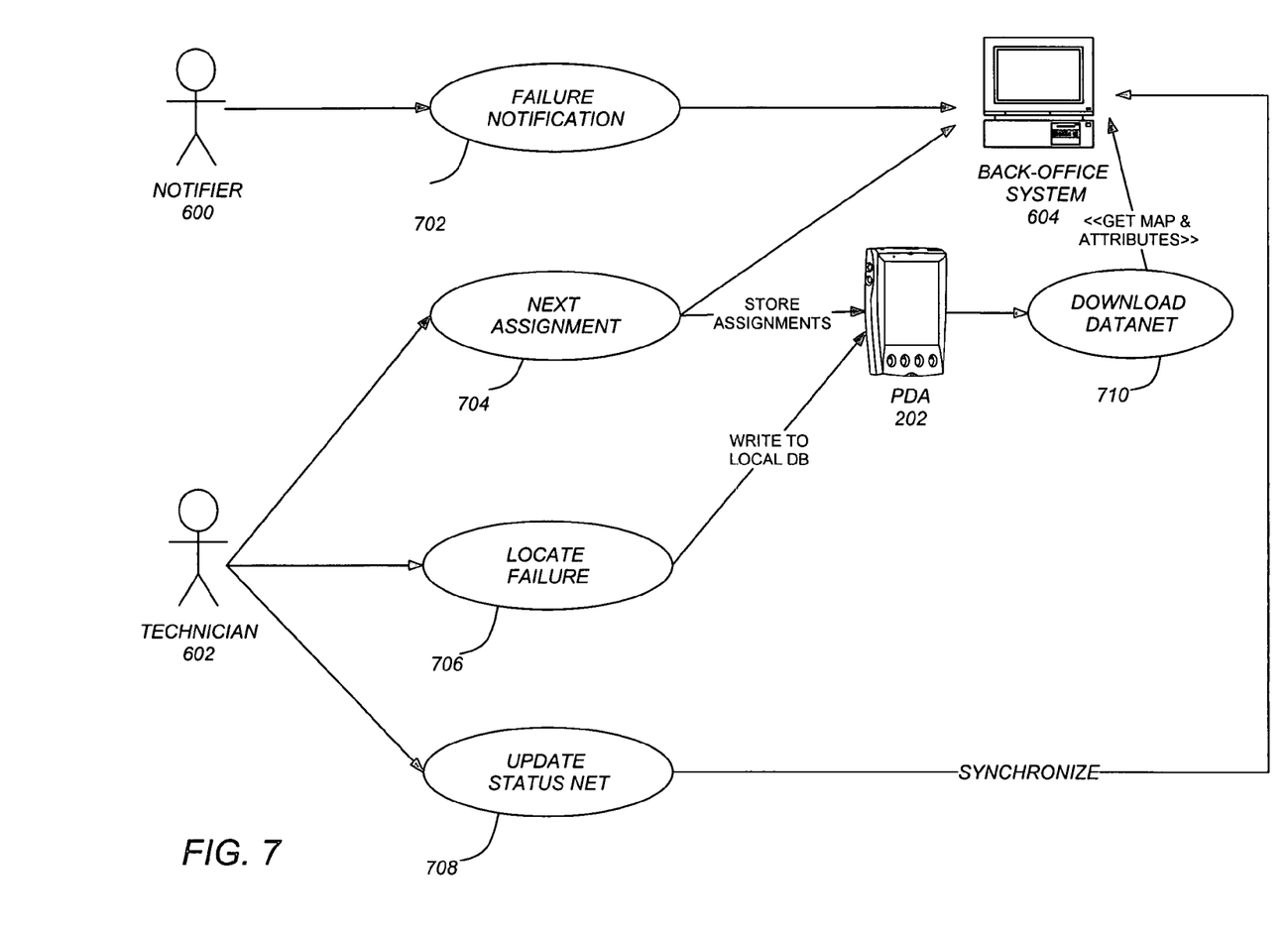
FIG. 7 illustrates the implementation wherein a field technician maintains on-demand network access to the back office system in accordance with one or more embodiments of the invention.
Figure 8:
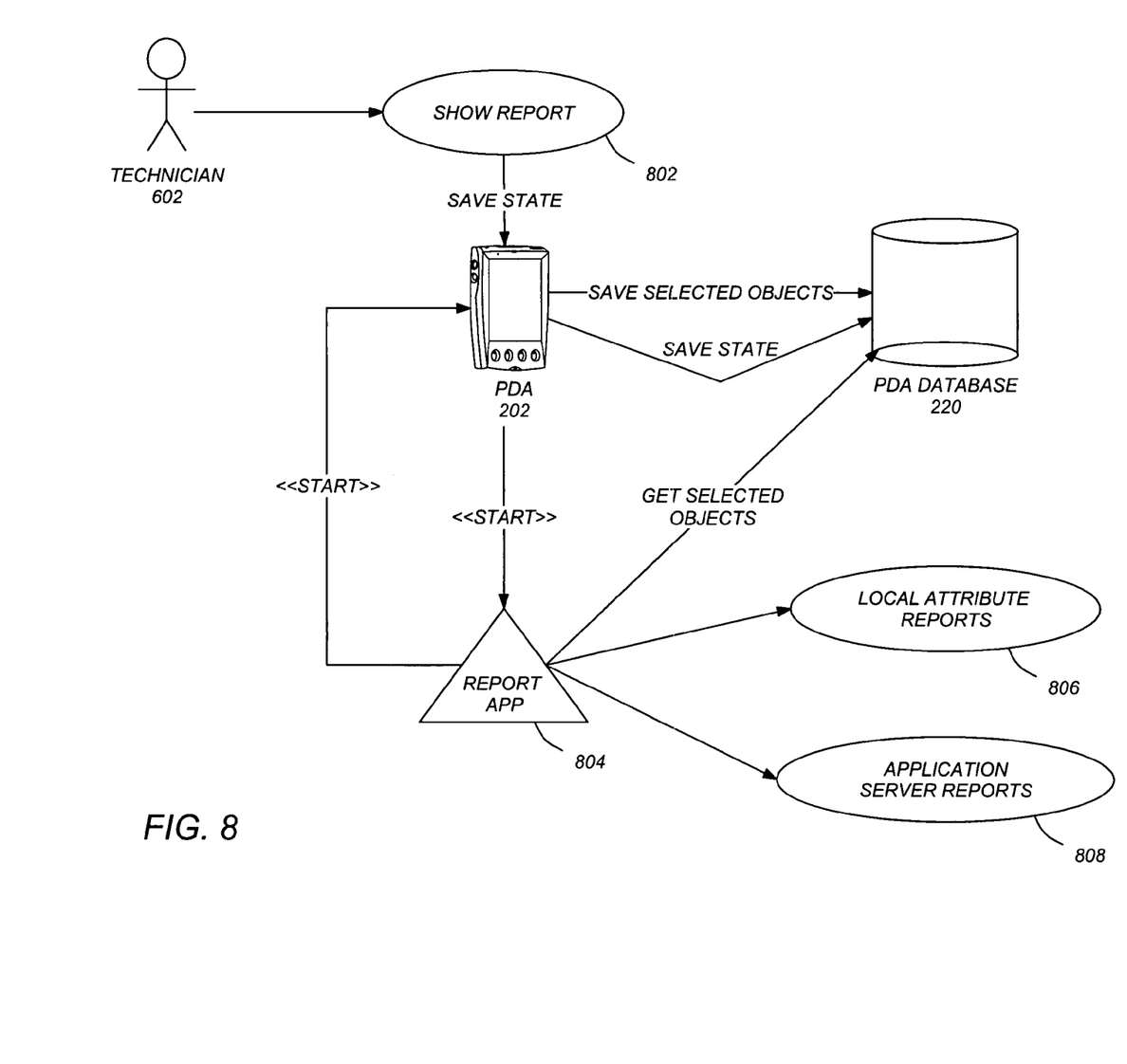
FIG. 8 illustrates the implementation wherein a field technician requests that a report be shown for objects selected on a map on PDA in accordance with one or more embodiments of the invention.

FIGS. 6–8 illustrate various implementations/situations in accordance with one or more embodiments of the invention. In the implementations of FIGS. 6–8 incidents in the field (e.g., failure incidents) occur wherein a field technician 602 retrieves assignments to repair/work at the failure incident location. Technician 602 retrieves map and geographic data for the failure location on a personal digital assistant and interacts with and updates the map and geographic data.

Field Technician Working Offline

With respect to FIG. 6, a failure notification 606 creates a failure notification event for the back office system 604. Thus, upon a location in the field failing (e.g., a broken water main or street light), a notifier 600 notifies the back office system 604 where the failure incident is recorded for processing. The failure notification system 606 operates asynchronously from technician 602 activities.

FIG. 6 illustrates the implementation wherein a field technician 602 is working offline such that the technician only has net access at the beginning and end of the day. At the beginning of the day, the technician checks for his/her assignments 608 in the office 604 by communicating with the back office system 604 using the synchronization application 238 on the PDA 102. The assignments are conveyed to the servlet 108. Servlet 108 obtains the relevant information for the assignments. For each assignment, the servlet 108 obtains map and attribute data to be downloaded 616 from the back office system 604. Thereafter, the data is placed (by servlet 108) in a location that is accessible to PDA client 102. PDA client 102 downloads and stores the data in the local PDA database 220 (as described with respect to FIG. 4).

After obtaining the necessary information, the technician 602 disconnects from the network 118. As needed, the technician 602 accesses the mapguide PDA 202 to obtain and display 610 geographic information including one or more layers. Thus, the technician 602 can locate and examine a failure incident 610 (i.e., where a system has failed such as a broken water main) by viewing a map of the area of interest and viewing relevant attribute data. Accordingly, the technician 602 starts the PDA application 202 and specifies the current assignment. In response, the application 202 displays a map of the area of interest (i.e., as described with respect to FIG. 5). To note any changes on the map or to update the status of an assignment, the PDA application 202 captures the status information related to the assignment from the technician 602 and stores the information in the local PDA database 220 (i.e., the update status locally component 612).

At the end of the day, when the PDA 202 is online and connected to the network 118, the technician 602 can synchronize the PDA 202 with the back office system 604 using synchronization application 238. In other words, the technician 602 transfers the status information related to the day's assignments from the local PDA database 220 to the back office system 604 via the network 118 (i.e., component 614).

Field Technician With Network Access

FIG. 7 illustrates the implementation wherein a field technician 602 maintains on-demand network 118 access to the back office system 604. Similar to the implementation of FIG. 6, failure notification 606 creates a failure notification event for the back office system 604. Upon a location in the field failing (e.g., a notification received that there is a broken water main or street light), a notifier 600 notifies the back office system 604 where the failure incident is so that the it may be recorded for processing. The failure notification system 606 operates asynchronously from technician 602 activities.

To determine the next location(s) or job(s) for the technician 602 to serve (i.e., component 704), the technician communicates with the back office system 604 using the network 118 (through synchronization application 238) to obtain the assignments and store them in PDA catalog 220 on the PDA 202 (as described with respect to FIG. 4). Accordingly, the technician 602 retrieves the next assignments for the day by communicating with the back office system 604 using synchronization application 238. The assignments are conveyed to the servlet 108. The servlet 108 receives the information about the assignments and dynamically downloads 710 all map and attribute data necessary for the assignments from the back office system 604 (i.e., by accessing. MapGuide server 120). The downloaded data is then placed in a location accessible to PDA 102 and the location of the data is provided to synchronization application 238. Thereafter the data is retrieved and stored in the local PDA database 220.

Similar to the implementation described in FIG. 6, the locate failure component 706 is utilized to view a map of the area of interest, to view relevant attribute data, and to locate failure incidents. Accordingly, the technician 602 starts the mapguide PDA application 202 and specifies an assignment. In response, the application 202 displays a map of the area of interest (with the relevant layers) (as described with respect to FIG. 5). To provide the locate failure 706 functionality to an online technician 602, embodiments of the invention utilize a combination of local resources and resources obtained over the network 118.

Upon completing the viewing of the map (and other relevant data), component 708 provides the capability to capture status information related to the assignment from the technician 602 and transferring the information to the back office system 604 using the synchronization application 238 (i.e., the status is updated dynamically over the network 118). Thus, the failure is updated, synchronized, and potentially resolved with back office system 604 dynamically.

Show Report

FIG. 8 illustrates implementations wherein a field technician 602 requests that a report be shown 802 for objects selected on a map on PDA 202 (i.e., the steps described in FIG. 5). In response to a report request, PDA application 202 saves the identifications (IDs) of the selected objects (step 502 of FIG. 5) and the state of the PDA application 202 (step 504 of FIG. 5) in the PDA database 220. Subsequently, the PDA application 202 starts up the report application 804 (step 506 of FIG. 5). The report application 804 reads the IDs of the selected objects from the database 220.

Report application 804 then generates the reports for the objects using local attributes and formatting capabilities. If there is no network 118 access to back office system 604, the report is established and generated locally 806 based on business attributes in the local database 220 (e.g., steps 510 and 512 of FIG. 5). However, if network 118 access to back office system 604 is available, the report application 804 communicates 808 with a report application server (e.g., with request broker 224 which interacts with servlet resident viewer services 232) (i.e., step 508 of FIG. 5). The report application server provides for querying across the network 118 for dynamically formatted reports or reports based on non-local attribute data.

Upon obtaining the requested report, report application 804 restarts the mapguide PDA application 202 which restores its previous state after reading the state from the PDA database 220 (i.e., step 514 of FIG. 5).

CONCLUSION

This concludes the description of one or more embodiments of the invention. The following describes some alternative embodiments for accomplishing the present invention.

For example, any type of personal digital assistant or computer, such as a mainframe, minicomputer, or personal computer, or computer configuration, such as a timesharing mainframe, local area network, standalone personal computer, WINCE device, etc. could be used with the present invention.

In summary, a geographic information system on a personal digital assistant is provided that can be utilized both online and offline.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A system for accessing geographic information comprising:
   (a) two or more geographically distributed servers;
   (b) a thin client;
   (c) a servlet executing on one of the servers, wherein the servlet is implemented by a single code stream for use on multiple platforms, the servlet configured to:
      (i) obtain geographically distributed map data from the two or more servers wherein the map data comprises metadata in a form of layer definitions for vector based map layer data;
      (ii) obtain geographically distributed attribute data from the two or more servers;
      (iii) declutter the map and attribute data;
      (iv) compact and encode the map and attribute data;
      (v) place the compacted and encoded map and attribute data over a network in a location accessible to the thin client;
   (d) an application on the thin client, the application configured to:
      (i) obtain the compacted and encoded map and attribute data from the location over the network;
      (ii) display the compacted and encoded map and attribute data on the thin client.

2. The system of claim 1 wherein the thin client is not connected to the network when displaying the compacted and encoded map and attribute data.

3. The system of claim 1 wherein the application is further configured to transmit an assignment to the servlet and wherein the servlet is further configured to transmit compacted and encoded map and attribute data for the assignment.

4. The system of claim 3 wherein the application is further configured to synchronize a status related to the assignment by communicating with the servlet.

5. The system of claim 1, wherein the thin client comprises a personal digital assistant (PDA).

6. The system of claim 1, wherein the thin client comprises a smart phone.

7. A system for accessing geographic information comprising:
   (a) a thin client;
   (b) a local database on the thin client; and
   (c) an application on the thin client, the application configured to:
      (i) load an active workspace from the local database;
      (ii) the active workspace using map definitions obtained from map data that is geographically distributed on two or more geographically distributed servers to create a new map model wherein the map data comprises metadata in a form of layer definitions for vector based map layer data;
      (iii) the new map model populating layers in the map model, wherein compacted and encoded map and attribute data are formatted, wherein the attribute data is obtained from the two or more geographically distributed servers; and
      (iv) display the formatted compacted and encoded map and attribute data on the thin client.

8. The system of claim 7 wherein the compacted and encoded map and attribute data is stored in a local thin client.

9. The system of claim 7 wherein the compacted and encoded map and attribute data are obtained from a servlet across a network, wherein the servlet is implemented by a single code stream for use on multiple platforms.

10. The system of claim 7 wherein the thin client is not connected to a network.

11. The system of claim 7, wherein the thin client comprises a personal digital assistant (PDA).

12. The system of claim 7, wherein the thin client comprises a smart phone.

13. A system for accessing geographic information comprising:
   (a) two or more geographically distributed servers;
   (b) a servlet executing on one or more of the servers, wherein the servlet is implemented by a single code stream for use on multiple platforms, the servlet configured to:
      (i) obtain geographically distributed map data from the two or more servers wherein the map data comprises metadata in a form of layer definitions for vector based map layer data;
      (ii) obtain geographically distributed attribute data from the two or more servers;
      (iii) declutter the map and attribute data;
      (iv) compact and encode the map and attribute data; and
      (v) place the compacted and encoded map and attribute data over a network in a location accessible to a thin client.

14. The system of claim 13 wherein the servlet is further configured to:
   receive an assignment; and
   place compacted and encoded map and attribute data for the assignment.

15. The system of claim 14 wherein the servlet is further configured to synchronize a status related to the assignment by communicating with the thin client.

16. The system of claim 13 wherein the map and attribute data are for a single user.

17. The system of claim 13, wherein the thin client comprises a personal digital assistant (PDA).

18. The system of claim 13, wherein the thin client comprises a smart phone.

19. A method for accessing geographic information on a thin client, comprising:
   a servlet obtaining geographically distributed map data from two or more servers, wherein the servlet is implemented by a single code stream for use on multiple platforms and wherein the map data comprises metadata in a form of layer definitions for vector based map layer data;
   the servlet obtaining geographically distributed attribute data from the two or more servers;
   the servlet decluttering the map and attribute data;
   compacting and encoding the map and attribute data;

obtaining the compacted and encoded map and attribute data over a network on a thin client; and displaying the compacted and encoded map and attribute data on the thin client.

20. The method of claim 19 wherein the thin client is not connected to the network when displaying the compacted and encoded map and attribute data.

21. The method of claim 19 further comprising:
the thin client transmitting an assignment to a servlet; and
the servlet placing compacted and encoded map and attribute data for the assignment in a location accessible to the thin client.

22. The method of claim 21 further comprising synchronizing a status related to the assignment by communicating with the servlet.

23. The method of claim 19, wherein the thin client comprises a personal digital assistant (PDA).

24. The method of claim 19, wherein the thin client comprises a smart phone.

25. A method for accessing geographic information comprising:
loading an active workspace from a local database on a thin client;
the active workspace using map definitions, obtained from map data that is geographically distributed on two or more geographically distributed servers, to create a new map model wherein the map data comprises metadata in a form of layer definitions for vector based map layer data;
the new map model populating layers in the map model, wherein compacted and encoded map and attribute data are formatted, wherein the attribute data is obtained from the two or more geographically distributed servers; and
displaying the formatted compacted and encoded map and attribute data on the thin client.

26. The method of claim 25 wherein the compacted and encoded map and attribute data is stored in a local thin client database.

27. The method of claim 25 wherein the compacted and encoded map and attribute data are obtained from a servlet across a network.

28. The method of claim 25 wherein the thin client is not connected to a network.

29. The method of claim 25, wherein the thin client comprises a personal digital assistant (PDA).

30. The method of claim 25, wherein the thin client comprises a smart phone.

31. A method for accessing geographic information comprising:
a servlet obtaining geographically distributed map data from two or more geographically distributed servers, wherein the servlet is implemented by a single code stream for use on multiple platforms and wherein the map data comprises metadata in a form of layer definitions for vector based map layer data;
the servlet obtaining geographically distributed attribute data from the two or more geographically distributed servers;
decluttering the map and attribute data;
compacting and encoding the map and attribute data; and
placing the compacted and encoded map and attribute data over a network in a location accessible to a thin client.

32. The method of claim 31 further comprising:
receiving an assignment; and
placing compacted and encoded map and attribute data for the assignment.

33. The system of claim 32 further comprising synchronizing a status related to the assignment by communicating with the thin client.

34. The system of claim 32 wherein the map and attribute data are for a single user.

35. The method of claim 31, wherein the thin client comprises a personal digital assistant (PDA).

36. The method of claim 31, wherein the thin client comprises a smart phone.

37. An article of manufacture comprising a program storage medium readable by a computer hardware device and embodying one or more instructions executable by the computer hardware device to perform a method for accessing geographic information, the method comprising:
a servlet obtaining geographically distributed map data from two or more geographically distributed servers, wherein the servlet is implemented by a single code stream for use on multiple platforms and wherein the map data comprises metadata in a form of layer definitions for vector based map layer data;
the servlet obtaining geographically distributed attribute data from the two or more geographically distributed servers;
obtaining decluttered, compacted and encoded map and attribute data over a network; and
displaying the decluttered, compacted and encoded map and attribute data on a thin client.

38. The article of manufacture of claim 37 wherein the thin client is not connected to the network when displaying the decluttered, compacted and encoded map and attribute data.

39. The article of manufacture of claim 37, the method further comprising:
transmitting an assignment to a servlet; and
the servlet placing compacted and encoded map and attribute data for the assignment in a location accessible to the thin client.

40. The article of manufacture of claim 39, the method further comprising synchronizing a status related to the assignment by communicating with the servlet.

41. The article of manufacture of claim 37, wherein the thin client comprises a personal digital assistant (PDA).

42. The article of manufacture of claim 37, wherein the thin client comprises a smart phone.

43. A article of manufacture comprising a program storage medium readable by a thin client and embodying one or more instructions executable by the thin client to perform a method for accessing geographic information, the method comprising:
loading an active workspace from a local database on the thin client;
the active workspace using map definitions obtained from map data that is geographically distributed on two or more geographically distributed servers to create a new map model wherein the map data comprises metadata in a form of layer definitions for vector based map layer data;
the new map model populating layers in the map model, wherein compacted and encoded map and attribute data are formatted, wherein the attribute data is obtained from the geographically distributed servers; and
displaying the formatted compacted and encoded map and attribute data on the thin client.

44. The article of manufacture of claim 43 wherein the compacted and encoded map and attribute data is stored in a local thin client database.

45. The article of manufacture of claim 43 wherein the compacted and encoded map and attribute data are obtained from a servlet across a network.

46. The article of manufacture of claim 43 wherein the thin client is not connected to a network.

47. The article of manufacture of claim 43, wherein the thin client comprises a personal digital assistant (PDA).

48. The article of manufacture of claim 43, wherein the thin client comprises a smart phone.

49. An article of manufacture comprising a program storage medium readable by a computer hardware device and embodying one or more instructions executable by the computer hardware device to perform a method for accessing geographic information, the method comprising:

a servlet obtaining geographically distributed map data from two or more geographically distributed servers, wherein the servlet is implemented by a single code stream for use on multiple platforms and wherein the map data comprises metadata in a form of layer definitions for vector based map layer data;

the servlet obtaining geographically distributed attribute data from the two or more geographically distributed servers;

decluttering the map and attribute data;

compacting and encoding the map and attribute data; and placing the compacted and encoded map and attribute data over a network in a location accessible to a thin client.

50. The article of manufacture of claim 49 wherein the method further comprises:

receiving an assignment; and placing compacted and encoded map and attribute data for the assignment.

51. The article of manufacture of claim 50 wherein the method further comprises synchronizing a status related to the assignment by communicating with the thin client.

52. The article of manufacture of claim 49 wherein the map and attribute data are for a single user.

53. The article of manufacture of claim 49, wherein the thin client comprises a personal digital assistant (PDA).

54. The article of manufacture of claim 49, wherein the thin client comprises a smart phone.

* * * * *